US010645658B2

(12) United States Patent
Chen et al.

(10) Patent No.: US 10,645,658 B2
(45) Date of Patent: May 5, 2020

(54) METHOD AND APPARATUS FOR UPLINK POWER CONSUMPTION REDUCTION IN NB-IOT

(71) Applicant: MediaTek Inc., Hsinchu (TW)

(72) Inventors: Po-Ying Chen, Hsinchu (TW); Mingchun Chiang, Kaohsiung (TW); Jeng-Yi Tsai, Hsinchu (TW); Ho-Chi Huang, Hsinchu County (TW); Wei-Nan Sun, Hsinchu County (TW); Wenze Qu, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/688,806

(22) Filed: Aug. 28, 2017

(65) Prior Publication Data
US 2018/0070317 A1 Mar. 8, 2018

Related U.S. Application Data

(60) Provisional application No. 62/383,688, filed on Sep. 6, 2016.

(30) Foreign Application Priority Data

Aug. 21, 2017 (CN) .......................... 2017 1 0720245

(51) Int. Cl.
*H04W 52/14* (2009.01)
*H04W 52/02* (2009.01)
(Continued)

(52) U.S. Cl.
CPC ......... *H04W 52/146* (2013.01); *H04L 5/0055* (2013.01); *H04L 67/12* (2013.01);
(Continued)

(58) Field of Classification Search
CPC .................................................. H04W 52/146
See application file for complete search history.

(56) References Cited

U.S. PATENT DOCUMENTS

| 8,644,207 B1* | 2/2014 | Vivanco | H04W 4/06 370/232 |
|---|---|---|---|
| 2002/0065086 A1* | 5/2002 | Vanttinen | H04W 8/08 455/456.1 |

(Continued)

FOREIGN PATENT DOCUMENTS

WO    WO 2016122197 A1    8/2016

OTHER PUBLICATIONS

Taiwan Intellectual Property Office, Office Action for Taiwan Patent Application No. 106130379, dated Nov. 27, 2018.
(Continued)

*Primary Examiner* — Andrew Lai
*Assistant Examiner* — Andrew C Lee
(74) *Attorney, Agent, or Firm* — Han IP PLLC; Andy M. Han

(57) ABSTRACT

Methods and apparatuses pertaining to uplink power consumption reduction for a Narrow Band-Internet of Things (NB-IoT) apparatus. The NB-IoT apparatus may transmit uplink data to a network apparatus via an uplink channel. The network apparatus may decode the uplink data. The network apparatus may further transmit an acknowledgement (ACK) indicator to the NB-IoT apparatus before receiving all the uplink data if the uplink data is decoded successfully. The NB-IoT apparatus may monitor whether an ACK indicator is received from the network apparatus during a transmission gap of the uplink channel. The NB-IoT apparatus may further terminate uplink data transmission if the ACK indicator is received.

18 Claims, 12 Drawing Sheets

(51) Int. Cl.
  *H04W 74/08* (2009.01)
  *H04W 72/04* (2009.01)
  *H04L 5/00* (2006.01)
  *H04W 72/08* (2009.01)
  *H04L 29/08* (2006.01)
  *H04W 52/24* (2009.01)
  *H04W 52/48* (2009.01)

(52) U.S. Cl.
  CPC ..... *H04W 52/0212* (2013.01); *H04W 52/242* (2013.01); *H04W 52/48* (2013.01); *H04W 72/042* (2013.01); *H04W 72/085* (2013.01); *H04W 74/0833* (2013.01); *Y02D 70/00* (2018.01); *Y02D 70/1242* (2018.01); *Y02D 70/1262* (2018.01); *Y02D 70/1264* (2018.01); *Y02D 70/20* (2018.01); *Y02D 70/26* (2018.01)

(56) References Cited

U.S. PATENT DOCUMENTS

| | | | | |
|---|---|---|---|---|
| 2003/0103521 | A1* | 6/2003 | Raphaeli | H04B 3/542 370/445 |
| 2004/0250059 | A1* | 12/2004 | Ramelson | H04L 63/0428 713/150 |
| 2008/0063031 | A1 | 3/2008 | Kanter | |
| 2016/0212750 | A1* | 7/2016 | Xu | H04B 7/0456 |
| 2016/0227582 | A1* | 8/2016 | Vajapeyam | H04W 4/70 |
| 2016/0249358 | A1* | 8/2016 | Li | H04W 72/0453 |
| 2016/0295345 | A1* | 10/2016 | Oh | H04W 4/70 |
| 2016/0345118 | A1* | 11/2016 | Oh | H04W 4/70 |
| 2016/0345326 | A1* | 11/2016 | Yerramalli | H04W 72/0453 |
| 2016/0345328 | A1* | 11/2016 | Reznik | H04L 1/0025 |
| 2017/0034831 | A1* | 2/2017 | Yerramalli | H04W 72/08 |
| 2017/0215157 | A1* | 7/2017 | Yang | H04B 7/26 |
| 2017/0215202 | A1* | 7/2017 | Yang | H04L 5/0048 |
| 2017/0230149 | A1* | 8/2017 | Wang | H04L 1/0057 |
| 2017/0251391 | A1* | 8/2017 | Kinthada Venkata | H04L 67/12 |
| 2017/0280399 | A1* | 9/2017 | Chrisikos | H04W 52/243 |
| 2017/0288845 | A1* | 10/2017 | Axmon | H04L 5/16 |
| 2017/0290001 | A1* | 10/2017 | Axmon | H04W 4/70 |
| 2017/0331670 | A1* | 11/2017 | Parkvall | H04J 11/0079 |
| 2018/0006763 | A1* | 1/2018 | Kim | H04L 5/00 |
| 2018/0184246 | A1* | 6/2018 | Ryu | H04W 8/02 |
| 2018/0249509 | A1* | 8/2018 | Yi | H04W 48/18 |

OTHER PUBLICATIONS

3GPP, Technical Specification Group Radio Access Network; Evolved Universal Terrestrial Radio Access (E-UTRA); Physical channels and modulation (Release 13), 3GPP TS 36.211 V13.2.0, Jun. 2016.

* cited by examiner

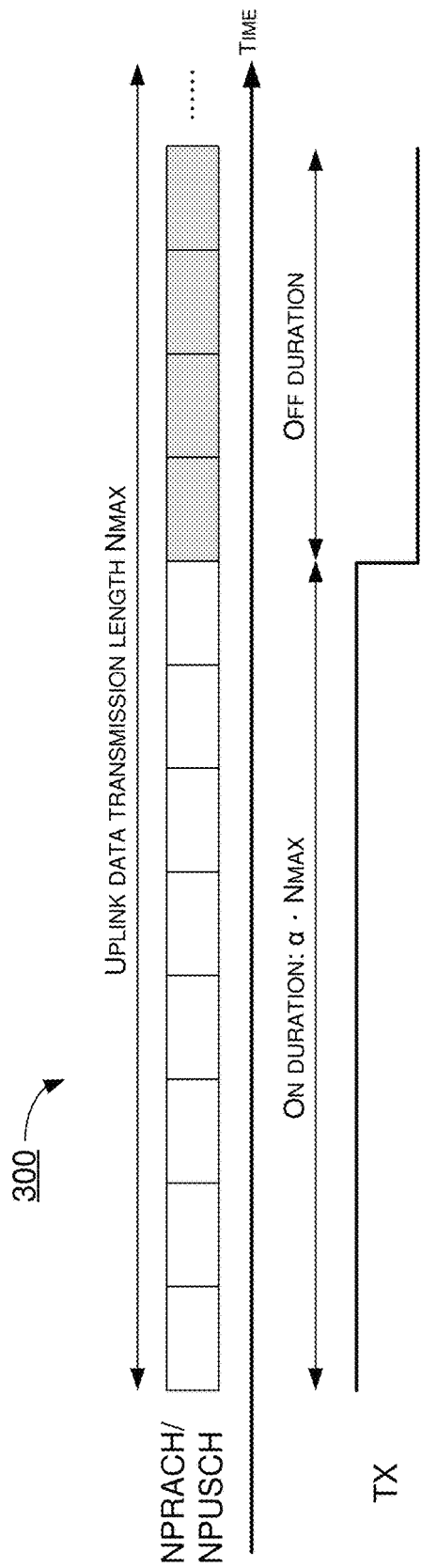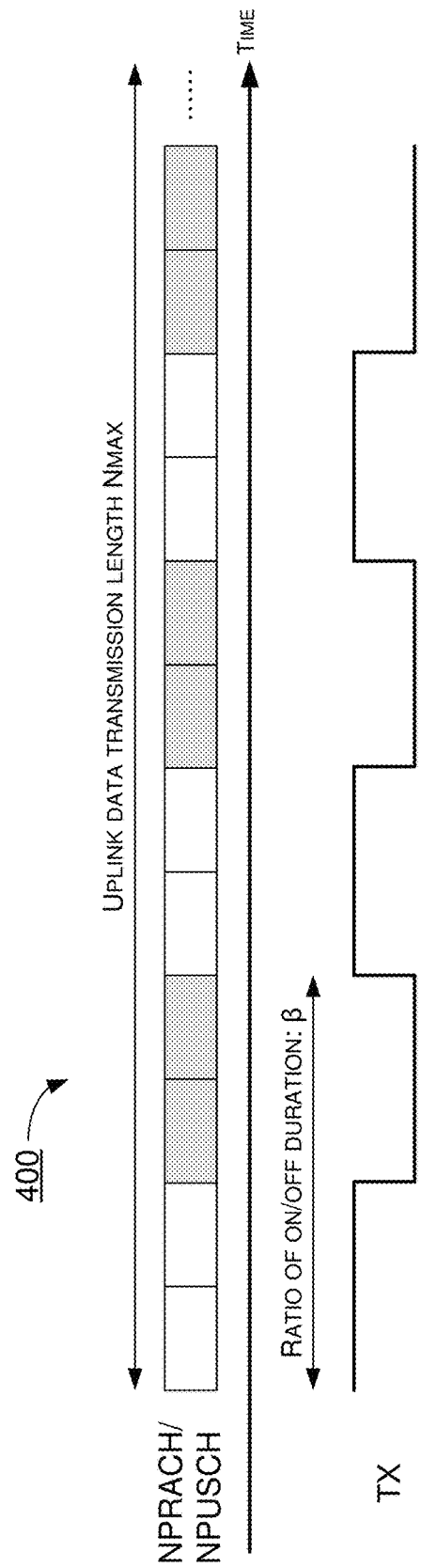

METHOD AND APPARATUS FOR UPLINK POWER CONSUMPTION REDUCTION IN NB-IOT

CROSS REFERENCE TO RELATED PATENT APPLICATION(S)

The present disclosure is part of a non-provisional application claiming the priority benefit of U.S. Patent Application No. 62/383,688, filed on 6 Sep. 2016, and China Patent Application No. 201710720245.5, filed on 21 Aug. 2017. The contents of above-listed applications are incorporated by reference in their entirety.

TECHNICAL FIELD

The present disclosure is generally related to wireless communications and, more particularly, to Narrow Band-Internet of Things (NB-IoT) uplink power consumption reduction.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In these communication technologies, UEs are operated by human users and may be frequently charged.

In coming next generation communication technologies such as 5G, Internet of Things (IoT) or Narrow Band Internet of Things (NB-IoT), more and more devices will be deployed as a machine type apparatus such as an immobile or a stationary apparatus, a home apparatus, an infrastructure apparatus or a monitoring apparatus. These NB-IoT apparatus may need to be in operation for long time without large battery or frequent charging. When the NB-IoT apparatus is configured to periodically report data, it will consume significant power consumption. If the NB-IoT apparatus keep reporting data without power saving mechanism, it may run out of battery in a short time.

Accordingly, when a NB-IoT apparatus is configured to periodically transmit uplink data, power consumption will be an important issue for the NB-IoT apparatus. Therefore, it is needed to provide a power saving mechanism for the NB-IoT apparatus to reduce uplink power consumption.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues with respect to uplink power consumption reduction for a NB-IoT apparatus.

In one aspect, a method may involve a NB-IoT apparatus transmitting uplink data to a network apparatus via an uplink channel. The method may also involve the NB-IoT apparatus monitoring whether an acknowledgement (ACK) indicator is received from the network apparatus during a transmission gap of the uplink channel. The method may further involve the NB-IoT apparatus terminating uplink data transmission if the ACK indicator is received.

In another aspect, a method may involve a network apparatus receiving uplink data from a NB-IoT apparatus via an uplink channel. The method may also involve the network apparatus decoding the uplink data. The method may further involve the network apparatus transmitting an ACK indicator to the NB-IoT apparatus if the uplink data is decoded successfully. The ACK indicator is transmitted before receiving all the uplink data.

In one aspect, a method may involve a NB-IoT apparatus performing uplink data transmission via an uplink channel. The method may also involve the NB-IoT apparatus estimating channel quality of the uplink channel. The method may further involve the NB-IoT apparatus adjusting uplink data transmission length according to the channel quality.

In another aspect, a method may involve a NB-IoT apparatus performing uplink data transmission via an uplink channel. The method may also involve the NB-IoT apparatus estimating channel quality of the uplink channel. The method may further involve the NB-IoT apparatus adjusting transmission power level according to the channel quality.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram depicting an example scenario under schemes in accordance with implementations of the present disclosure.

FIG. 4 is a diagram depicting an example scenario under schemes in accordance with implementations of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to uplink power consumption reduction with respect to user equipment in wireless communications. According to the present disclosure, a number of possible solutions may be implemented separately or jointly. That is, although these possible solutions may be described below separately, two or more of these possible solutions may be implemented in one combination or another.

Figure 1:
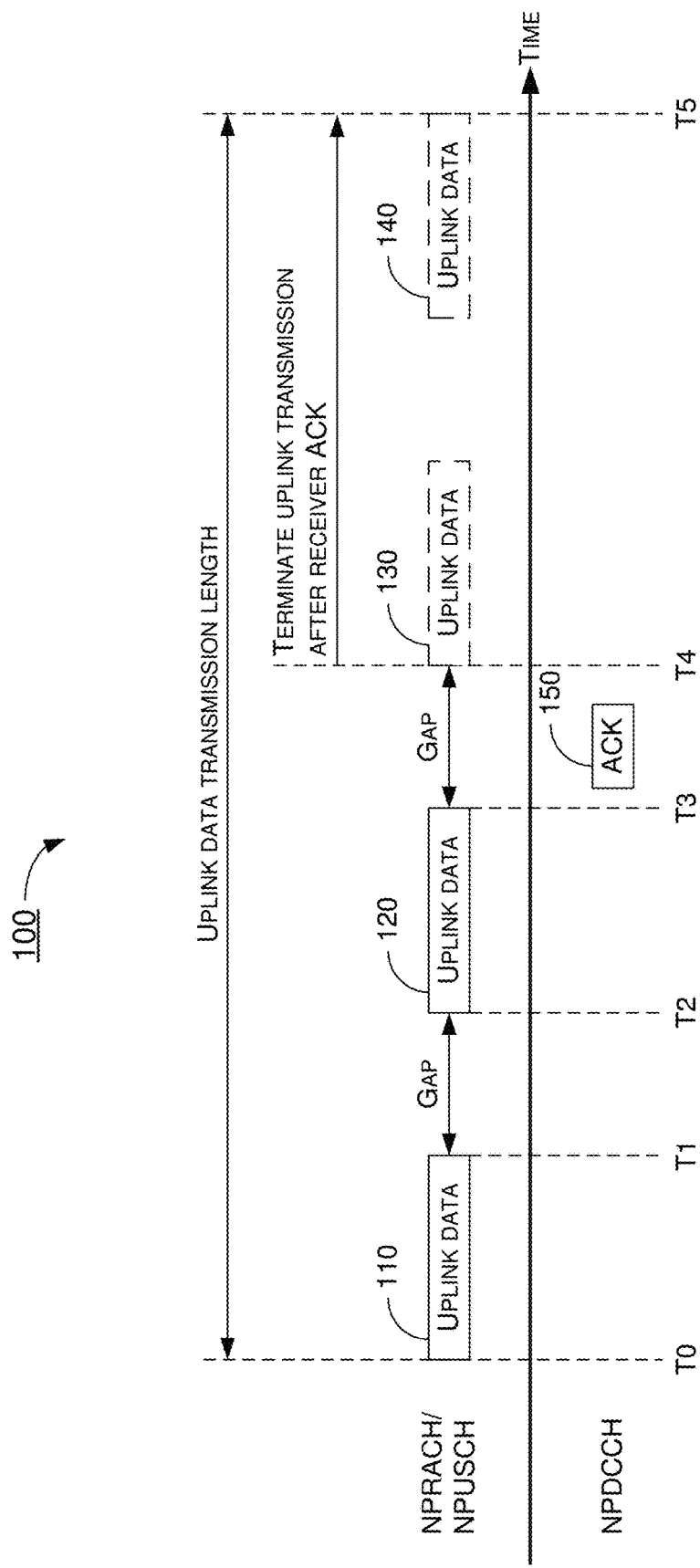
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a Narrow Band-Internet of Things (NB-IoT) apparatus and a network apparatus, which may be part of a wireless network (e.g., a LTE network, a LTE-Advanced network, a LTE-Advanced Pro network, a 5G network or an IoT network). The NB-IoT apparatus is able to transmit uplink data to the network apparatus via an uplink channel such as, for example and without limitation, a Narrowband Physical Random Access Channel (NPRACH) or a Narrowband Physical Uplink Shared Channel (NPUSCH). The network apparatus is able to transmit downlink data to the NB-IoT apparatus via a downlink channel such as, for example and without limitation, a Narrowband Physical Downlink Control Channel (NPD-CCH).

According to implementations of the present disclosure, the network apparatus may configure an uplink data transmission length for the NB-IoT apparatus to perform uplink data transmission via the NPUSCH. The NB-IoT apparatus has to perform uplink data transmission during the uplink data transmission length. The network apparatus may further configure a plurality of uplink transmission gaps in the uplink data transmission length for the NB-IoT apparatus to perform timing or frequency reacquisition. As showed in FIG. 1, the uplink data transmission length is configured from t0 to t5. The transmission gaps of the NPUSCH are configured, for example, from t1 to t2 and from t3 to t4. The NB-IoT apparatus is configured to transmit uplink data 110, 120, 130 and 140 in the uplink data transmission length. The uplink data 110, 120, 130 and 140 may have repetition data for increasing signal diversity and robustness. When the network apparatus receives the uplink data 110 or 120, the network apparatus may start to decode the uplink data before receiving all the uplink data 110, 120, 130 and 140. If the network apparatus decodes the uplink data successfully, the network apparatus is configured to transmit acknowledgement (ACK) indicator 150 to the NB-IoT apparatus in the uplink transmission gap (e.g., between t3 and t4).

The NB-IoT apparatus is configured to monitor the NPD-CCH during the uplink transmission gaps. If ACK indicator 150 is received, it means that the network apparatus has received and decoded the uplink data successfully, the NB-IoT apparatus is configured to terminate uplink data transmission after receiving ACK indicator 150. Since the uplink data are successfully decoded by the network apparatus, the NB-IoT apparatus is able to stop uplink data transmission and not transmit the rest uplink data 130 and 140. Thus, the uplink data transmission can be early terminated and the uplink transmission power consumption can be reduced.

Figure 2:
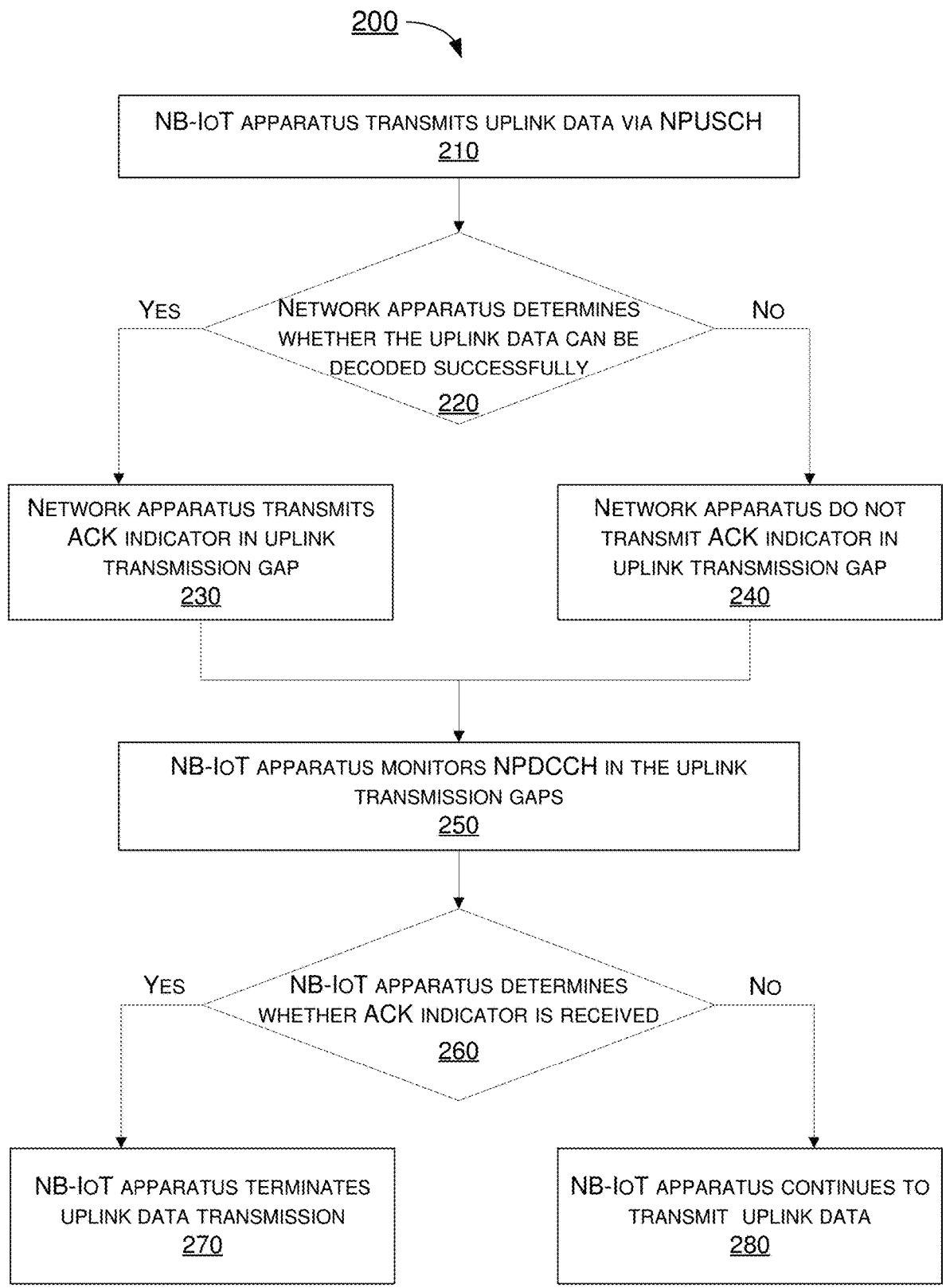
FIG. 2 is a diagram depicting an example process of early termination in accordance with an implementation of the present disclosure.

FIG. 2 illustrates an example process 200 of early termination in accordance with an implementation of the present disclosure. Process 200 may be implemented in any network involving a NB-IoT apparatus and a wireless network, to effect various features and/or aspects of the proposed concepts and schemes of the present disclosure. More specifically, process 200 may pertain to early termination of uplink data transmission. Process 200 may include one or more operations, actions, or functions as represented by one or more of blocks 210, 220, 230, 240, 250, 260, 270 and 280. Although illustrated as discrete blocks, various blocks of process 200 may be divided into additional blocks, combined into fewer blocks, or eliminated, depending on the desired implementation. Process 200 may be implemented, whether completely or partially, by each of the NB-IoT apparatus and the network apparatus described above as well as by each of NB-IoT apparatus 1010 and network apparatus 1020 described below. Solely for illustrative purposes and without limiting the scope, description of process 200 is provided below in the context of NB-IoT apparatus and network apparatus. Process 200 may begin at 210.

At 210, the NB-IoT apparatus may transmit uplink data to the network apparatus via an uplink channel (e.g., NPUSCH or NPRACH). Process 200 may proceed from 210 to 220.

At 220, the network apparatus may determine whether the uplink data can be decoded successfully. If yes, process 200 may proceed from 220 to 230. If no, process 200 may proceed from 220 to 240.

At 230, the network apparatus may transmit an ACK indicator to the NB-IoT apparatus in an uplink transmission gap. Process 200 may proceed from 230 to 250.

At 240, the network apparatus may not transmit an ACK indicator to the NB-IoT apparatus in an uplink transmission gap. Alternatively, the network apparatus may transmit a NACK indicator to the NB-IoT apparatus in an uplink transmission gap. Process 200 may proceed from 240 to 250.

At 250, the NB-IoT apparatus may monitor a downlink channel (e.g., NPDCCH) in the uplink transmission gaps. Process 200 may proceed from 250 to 260.

At 260, the NB-IoT apparatus may determine whether an ACK indicator is received. If yes, process 200 may proceed from 260 to 270. If no, process 200 may proceed from 260 to 280.

At 270, the NB-IoT apparatus may terminate the uplink data transmission.

At 280, the NB-IoT apparatus may continue to transmit the uplink data.

In some implementations, the ACK indicator may be a Hybrid Automatic Repeat Request (HARQ) ACK, a new indicator or any type of indicator representing whether the uplink data are received or decoded successfully. For example, the ACK indicator may be a new data indicator in the form of one data bit. If the new data indicator indicates new data, it means that an uplink data packet is received and a new data packet should be transmitted. If the new data indicator indicates old data, it means that an uplink data packet is not received and an old data packet should be transmitted. Thus, the new data indicator can be used to represent an ACK indicator or a NACK indicator. In NB-IoT, the ACK/NACK indicator is carried in the NPDCCH. In other implementations, the ACK/NACK indicator may also be carried in other channels or a new channel.

FIG. 3 and FIG. 4 illustrate example scenarios 300 and 400 under schemes in accordance with implementations of the present disclosure. Scenarios 300 and 400 involve a NB-IoT apparatus and a network apparatus, which may be part of a wireless network (e.g., a LTE network, a LTE-Advanced network, a LTE-Advanced Pro network, a 5G network or an IoT network). The NB-IoT apparatus is able to transmit uplink data to the network apparatus via an uplink channel such as, for example and without limitation, a Narrowband Physical Random Access Channel (NPRACH) or a Narrowband Physical Uplink Shared Channel (NPUSCH). The network apparatus is able to transmit downlink data to the NB-IoT apparatus via a downlink channel such as, for example and without limitation, a Narrowband Physical Downlink Control Channel (NPDCCH).

According to implementations of the present disclosure, the NB-IoT apparatus may receive a network configured uplink data transmission length $N_{max}$ from the network apparatus for performing uplink data transmission via the NPUSCH. At first, the NB-IoT apparatus may configure an uplink data transmission length $N_{TX}=N_{max}$ and perform uplink data transmission with $N_{TX}$. Then the NB-IoT apparatus may estimate channel quality of the NPUSCH. The NB-IoT apparatus may further adjust uplink data transmission length $N_{TX}$ according to the channel quality. More specifically, the NB-IoT apparatus may determine whether the channel quality is greater than a predetermined condition. The NB-IoT apparatus may adjust the uplink data transmission length by a scaling factor $\alpha$ (e.g., $N_{TX}=\alpha \cdot N_{max}$) according to the channel quality. The scaling factor may be adjusted by an ACK offset value $\Delta_{ACK}$ or a NACK offset value $\Delta_{NACK}$ according to the channel quality. When the channel quality is greater than a predetermined condition, the NB-IoT apparatus may adjust the scaling factor by $\alpha=\alpha-\Delta_{ACK}$ (e.g., 0.9=1−0.1). When the channel quality is less than a predetermined condition, the NB-IoT apparatus may adjust the scaling factor by $\alpha=\alpha+\Delta_{NACK}$ (e.g., 0.6=0.5+0.1). The ACK offset value $\Delta_{ACK}$ and the NACK offset value $\Delta_{NACK}$ may also be adjusted according to the channel quality. For example, if the channel quality is good, the ACK offset value $\Delta_{ACK}$ may be increased from 0.1 to 0.2. If the channel quality is bad, the NACK offset value $\Delta_{NACK}$ may be increased from 0.1 to 0.2.

Accordingly, if the channel quality is greater than a predetermined condition, the NB-IoT apparatus may reduce the uplink data transmission length to reduce uplink power consumption. As showed in FIG. 3, the uplink data transmission length is reduced to $N_{TX}=\alpha \cdot N_{max}$. The NB-IoT apparatus may directly terminate uplink data transmission after a predetermined part (e.g., $\alpha \cdot N_{max}$) of the uplink data has been transmitted. The NB-IoT apparatus only turns on transmission (TX) and transmit the uplink data in the on duration and turns off transmission in the off duration. In some implementations, the NB-IoT apparatus may turn off a radio frequency circuit or part of front end circuits during the off duration to reduce power consumption.

Alternatively, the NB-IoT apparatus may adjust the uplink data transmission length by a predetermined on/off pattern. Specifically, the NB-IoT apparatus may determine a ratio of on/off duration β for a short period and repeatedly apply the ratio of on/off duration β to the whole uplink data transmission length $N_{max}$. The ratio of on/off duration β may be adjusted by an ACK offset value $\Delta_{ACK}$ or a NACK offset value $\Delta_{NACK}$ according to the channel quality. When the channel quality is greater than a predetermined condition, the NB-IoT apparatus may adjust the ratio of on/off duration by $\beta=\beta-\Delta_{ACK}$ (e.g., 0.9=1−0.1). When the channel quality is less than a predetermined condition, the NB-IoT apparatus may adjust the ratio of on/off duration by $\beta=\beta+\Delta_{NACK}$ (e.g., 1.1=1+0.1). The ACK offset value $\Delta_{ACK}$ and the NACK offset value $\Delta_{NACK}$ may also be adjusted according to the channel quality. For example, if the channel quality is good, the ACK offset value $\Delta_{ACK}$ may be increased from 0.1 to 0.2. If the channel quality is bad, the NACK offset value $\Delta_{NACK}$ may be increased from 0.1 to 0.2.

As showed in FIG. 4, the uplink data transmission length is reduced by partially turning off uplink data transmission. The NB-IoT apparatus only turns on transmission (TX) and transmit the uplink data in the on durations and turns off transmission in the off durations. In some implementations, the NB-IoT apparatus may turn off a radio frequency circuit or part of front end circuits during the off durations to reduce power consumption.

In some implementations, the network apparatus may schedule reference signals such as Demodulation Reference Signal (DMRS) in a downlink channel. The NB-IoT apparatus may need to receive the reference signals for channel estimation. Accordingly, if reference signals are scheduled in the off durations in FIG. 3 or FIG. 4, the NB-IoT apparatus may need to turn on a radio frequency circuit of the NB-IoT apparatus to receive the reference signals in the downlink channel.

In some implementations, how the NB-IoT apparatus determines whether the channel quality is greater than a predetermined condition may be implemented in different ways. For example, the NB-IoT apparatus may estimate the channel quality by determining whether a plurality of consecutive ACK indicators are received. If the NB-IoT apparatus receives N consecutive ACK indicators, it means that the uplink data are all transmitted successfully and the channel quality is good. The value of N may be adjusted according to practical applications. Alternatively, the NB-IoT apparatus may estimate the channel quality by determining whether path loss or block error rate (BLER) of the uplink channel is less than a threshold. If path loss or BLER of the uplink channel is low, it means that the channel quality is good. Alternatively, the NB-IoT apparatus may estimate the channel quality by determining whether a predetermined percentage of ACK indicators are received within a predetermined period T. If the NB-IoT apparatus receives a predetermined percentage (e.g., 90%) of ACK indicators within the predetermined period T, it means that most uplink data are transmitted successfully and the channel quality is good. The predetermined percentage may be adjusted according to practical applications. The predetermined period T may also be adjusted according to channel quality of the uplink channel. If the channel quality is good, the predetermined period T may be reduced. If the channel quality is bad, the predetermined period T may be increased. If the NB-IoT apparatus reselects to a new network apparatus, the predetermined period T may be reset to an initial value.

Figure 5:
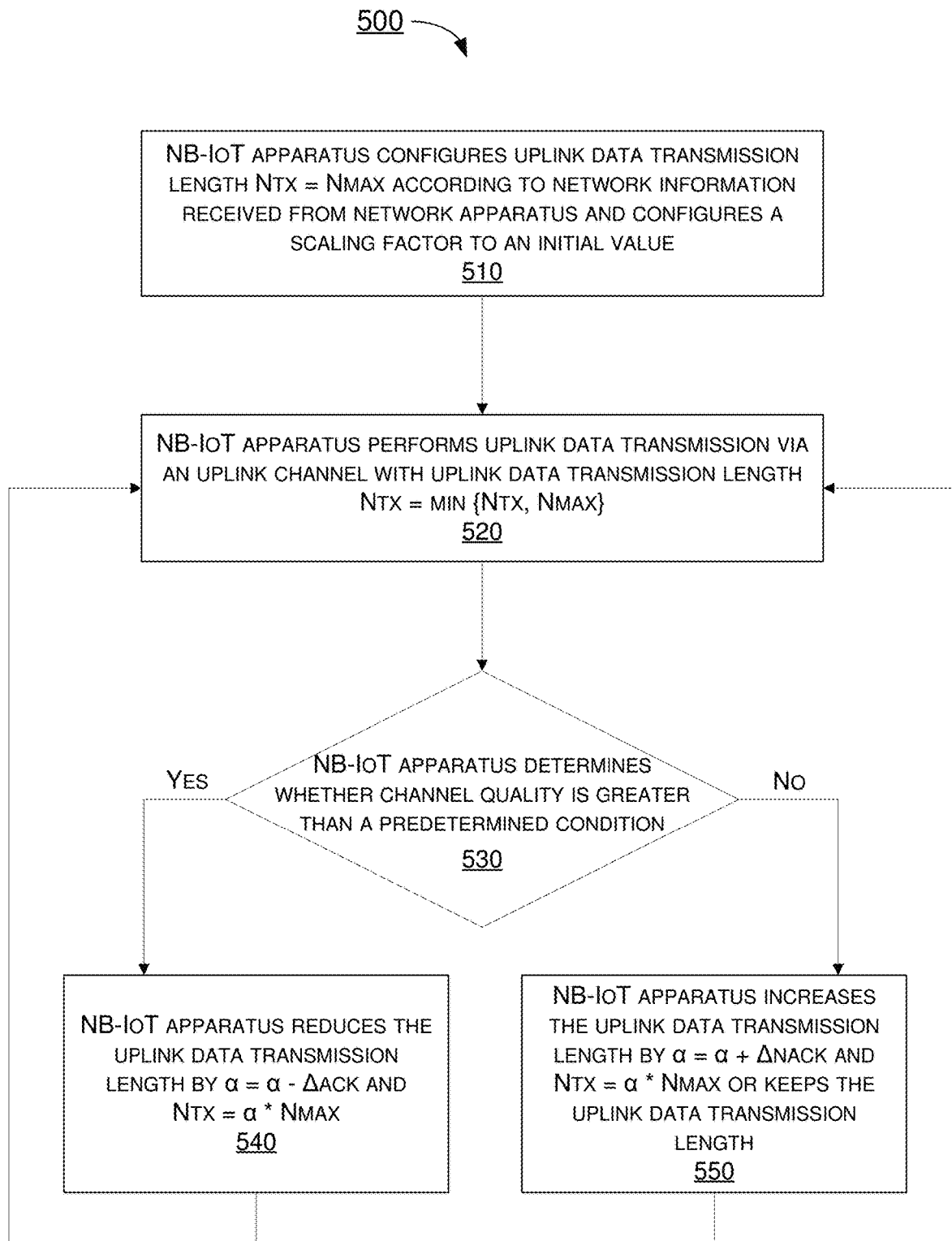
FIG. 5 is a diagram depicting an example process of reducing uplink data transmission length in accordance with an implementation of the present disclosure.

FIG. 5 illustrates an example process 500 of reducing uplink data transmission length in accordance with an implementation of the present disclosure. Process 500 may be implemented in any network involving a NB-IoT apparatus and a wireless network, to effect various features and/or aspects of the proposed concepts and schemes of the present disclosure. More specifically, process 500 may pertain to uplink power consumption reduction. Process 500 may include one or more operations, actions, or functions as represented by one or more of blocks 510, 520, 530, 540 and 550. Although illustrated as discrete blocks, various blocks of process 500 may be divided into additional blocks, combined into fewer blocks, or eliminated, depending on the desired implementation. Process 500 may be implemented, whether completely or partially, by the NB-IoT apparatus described above as well as by NB-IoT apparatus 1010 described below. Solely for illustrative purposes and without limiting the scope, description of process 500 is provided below in the context of NB-IoT apparatus and network apparatus. Process 500 may begin at 510.

At 510, the NB-IoT apparatus may configure the uplink data transmission length $N_{TX}=N_{max}$ according to the network information received from the network apparatus and configure a scaling factor α to an initial value. For example, the scaling factor may be configured as α=1. Alternatively, the NB-IoT apparatus may configure a ratio of on/off duration β to an initial value. The uplink data transmission length $N_{max}$ is configured by the network apparatus. Process 500 may proceed from 510 to 520.

At 520, the NB-IoT apparatus may perform uplink data transmission via an uplink channel with the uplink data transmission length $N_{TX}$ min $\{N_{TX}, N_{max}\}$. Process 500 may proceed from 520 to 530.

At 530, the NB-IoT apparatus may determine whether the channel quality is greater than a predetermined condition. If yes, process 500 may proceed from 530 to 540. If no, process 500 may proceed from 530 to 550.

At 540, the NB-IoT apparatus may reduce the uplink data transmission length by $α=α-\Delta_{ACK}$ and $N_{TX}=α·N_{max}$. Alternatively, the NB-IoT apparatus may reduce the ratio of on/off duration β by $β=β-\Delta_{ACK}$. Process 500 may further proceed from 540 to 520.

At 550, the NB-IoT apparatus may increase the uplink data transmission length by $α=α+\Delta_{NACK}$ and $N_{TX}=α·N_{max}$ or keep the uplink data transmission length. Alternatively, the NB-IoT apparatus may increase the ratio of on/off duration β by $β=β+\Delta_{NACK}$ or keep the ratio of on/off duration β. Process 500 may further proceed from 550 to 520.

Figure 6:
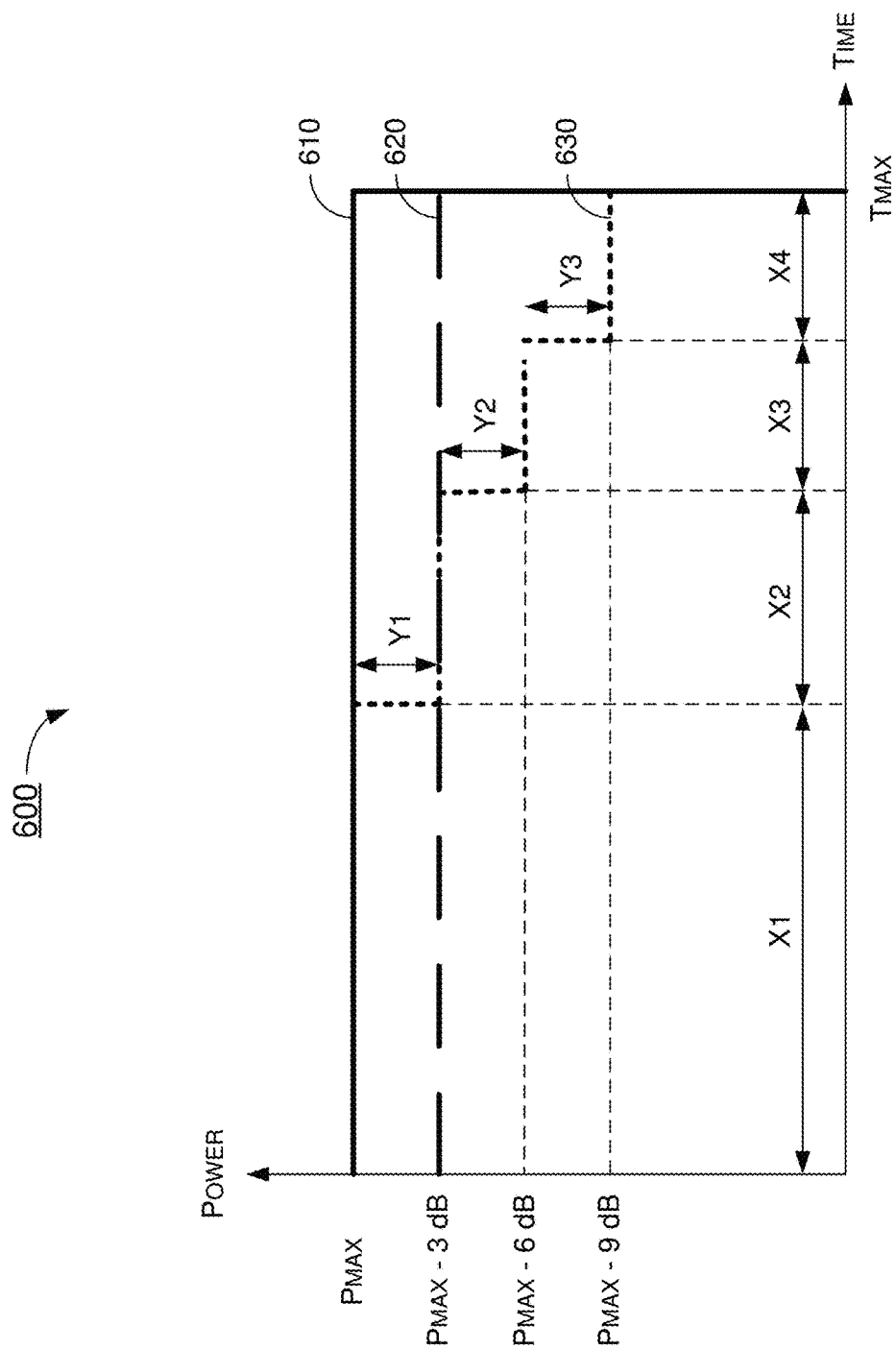
FIG. 6 is a diagram depicting an example scenario under schemes in accordance with implementations of the present disclosure.

FIG. 6 illustrates example scenario 600 under schemes in accordance with implementations of the present disclosure. Scenario 600 involves a NB-IoT apparatus and a network apparatus, which may be part of a wireless network (e.g., a LTE network, a LTE-Advanced network, a LTE-Advanced Pro network, a 5G network or an IoT network). The NB-IoT apparatus is able to transmit uplink data to the network apparatus via an uplink channel such as, for example and without limitation, a Narrowband Physical Random Access Channel (NPRACH) or a Narrowband Physical Uplink Shared Channel (NPUSCH). The network apparatus is able to transmit downlink data to the NB-IoT apparatus via a downlink channel such as, for example and without limitation, a Narrowband Physical Downlink Control Channel (NPDCCH).

According to implementations of the present disclosure, the NB-IoT apparatus may receive a network configured transmission power level $P_{max}$ from the network apparatus for performing uplink data transmission via the NPUSCH. At first, the NB-IoT apparatus may configure a transmission power level $P_{TX}=P_{max}$ and perform uplink data transmission with $P_{max}$. Then the NB-IoT apparatus may estimate channel quality of the NPUSCH. The NB-IoT apparatus may further adjust transmission power level $P_{TX}$ according to the channel quality. More specifically, the NB-IoT apparatus may determine whether the channel quality is greater than a predetermined condition. The NB-IoT apparatus may adjust the transmission power level by an ACK power offset value $\Delta P_{ACK}$ or a NACK power offset value $\Delta P_{NACK}$ according to the channel quality. When the channel quality is greater than a predetermined condition, the NB-IoT apparatus may adjust the transmission power level by $P_{TX}=P_{TX}-\Delta P_{ACK}$. When the channel quality is less than a predetermined condition, the NB-IoT apparatus may adjust the transmission power level by $P_{TX}=P_{TX}+\Delta P_{NACK}$. The ACK power offset value $\Delta P_{ACK}$ and the NACK power offset value $\Delta P_{NACK}$ may also be adjusted according to the channel quality. For example, if the channel quality is good, the ACK power offset value $\Delta P_{ACK}$ may be increased from 3 dB to 6 dB. If the channel quality is bad, the NACK power offset value $\Delta P_{NACK}$ may be increased from 3 dB to 6 dB.

Accordingly, if the channel quality is greater than a predetermined condition, the NB-IoT apparatus may reduce the transmission power level to reduce uplink power consumption. As showed in FIG. 6, the transmission power pattern 601 is initial configured by the network apparatus. In transmission power pattern 601, the NB-IoT apparatus will transmit the uplink data by a network configured transmission power level $P_{max}$ for an uplink data transmission length $T_{max}$. If the channel quality is greater than a predetermined condition, the NB-IoT apparatus may change the transmission power to transmission power pattern 602. More specifically, the NB-IoT apparatus may directly reduce the transmission power level to $P_{max}-3$ dB during the whole uplink data transmission length $T_{max}$. In some implementations, if the channel quality is good enough, the NB-IoT apparatus may directly reduce the transmission power level to $P_{max}-6$ dB or $P_{max}-9$ dB during the whole uplink data transmission length $T_{max}$.

Alternatively, if the channel quality is greater than a predetermined condition, the NB-IoT apparatus may change the transmission power to transmission power pattern 603. More specifically, at first, the NB-IoT apparatus may configure a transmission power level $P_{TX}=P_{max}$ and perform uplink data transmission with $P_{max}$. Then the NB-IoT apparatus may estimate channel quality of the NPUSCH. The NB-IoT apparatus may further adjust transmission power level $P_{TX}$ according to the channel quality. As showed in FIG. 6, the NB-IoT apparatus only configures transmission power level $P_{TX}=P_{max}$ for X1 period. After X1 period, the NB-IoT apparatus may reduce the transmission power level by Y1 and configure transmission power level $P_{TX}=P_{max}-Y1$ for X2 period. After X2 period, the NB-IoT apparatus may further reduce the transmission power level by Y2 and configure transmission power level $P_{TX}=P_{max}-Y1-Y2$ for X3 period. After X3 period, the NB-IoT apparatus may further reduce the transmission power level by Y3 and configure transmission power level $P_{TX}=P_{max}-Y1-Y2-Y3$ for X4 period. Accordingly, if the channel quality is greater than a predetermined condition, the NB-IoT apparatus may gradually reduce the transmission power level to reduce uplink power consumption.

In some implementations, how the NB-IoT apparatus determines whether the channel quality is greater than a predetermined condition may be implemented in different ways. For example, the NB-IoT apparatus may estimate the channel quality by determining whether a plurality of consecutive ACK indicators are received. If the NB-IoT apparatus receives N consecutive ACK indicators, it means that the uplink data are all transmitted successfully and the channel quality is good. The value of N may be adjusted according to practical applications. Alternatively, the NB-IoT apparatus may estimate the channel quality by determining whether path loss or block error rate (BLER) of the uplink channel is less than a threshold. If path loss or BLER of the uplink channel is low, it means that the channel quality is good. Alternatively, the NB-IoT apparatus may estimate the channel quality by determining whether a predetermined percentage of ACK indicators are received within a predetermined period T. If the NB-IoT apparatus receives a predetermined percentage (e.g., 90%) of ACK indicators within the predetermined period T, it means that most uplink data are transmitted successfully and the channel quality is good. The predetermined percentage may be adjusted according to practical applications. The predetermined period T may also be adjusted according to channel quality of the uplink channel. If the channel quality is good, the predetermined period T may be reduced. If the channel quality is bad, the predetermined period T may be increased. If the NB-IoT apparatus reselects to a new network apparatus, the predetermined period T may be reset to an initial value.

Figure 7:
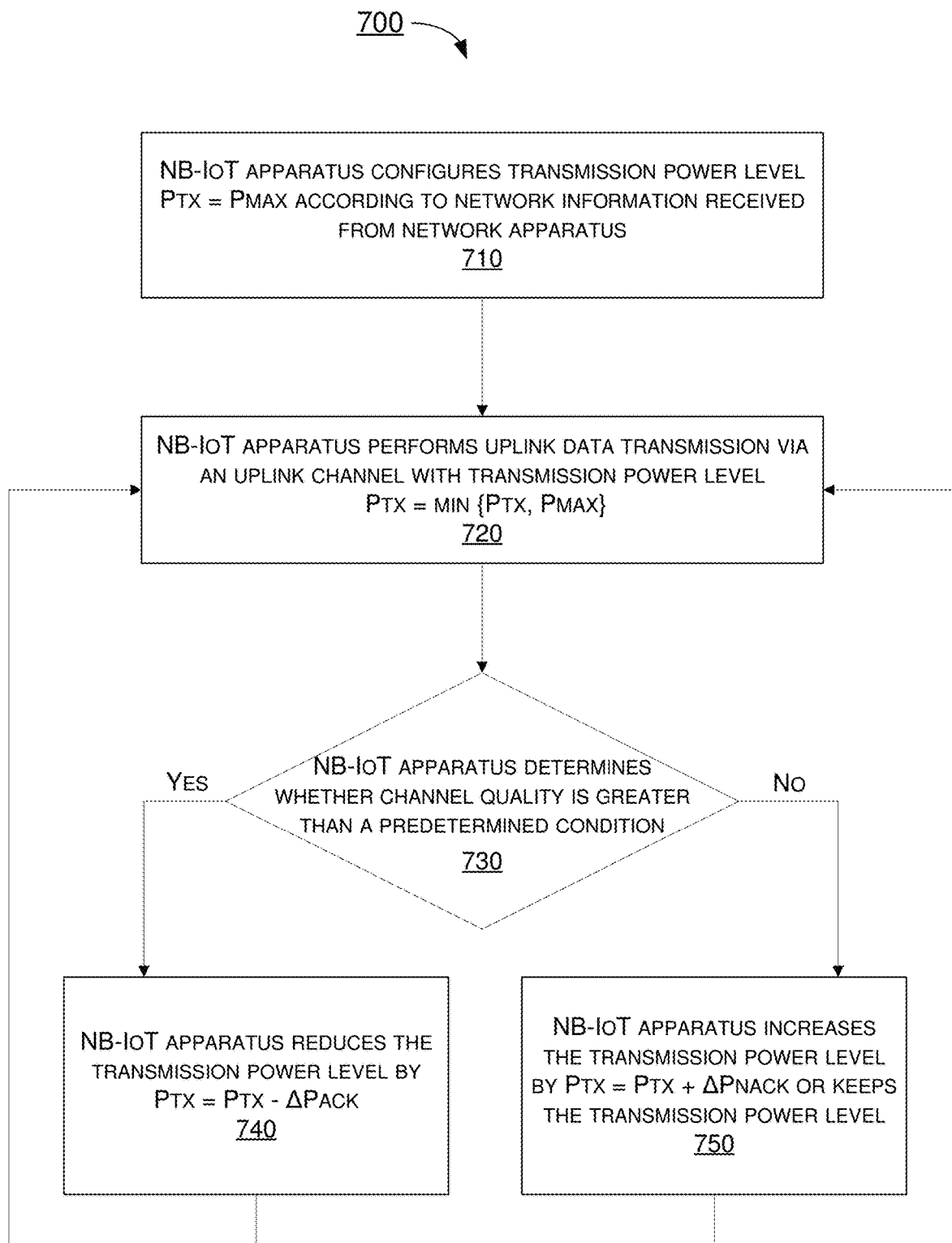
FIG. 7 is a diagram depicting an example process of reducing transmission power level in accordance with an implementation of the present disclosure.

FIG. 7 illustrates an example process 700 of reducing transmission power level in accordance with an implementation of the present disclosure. Process 700 may be implemented in any network involving a NB-IoT apparatus and a wireless network, to effect various features and/or aspects of the proposed concepts and schemes of the present disclosure. More specifically, process 700 may pertain to uplink power consumption reduction. Process 700 may include one or more operations, actions, or functions as represented by one or more of blocks 710, 720, 730, 740 and 750. Although illustrated as discrete blocks, various blocks of process 700 may be divided into additional blocks, combined into fewer blocks, or eliminated, depending on the desired implementation. Process 700 may be implemented, whether completely or partially, by the NB-IoT apparatus described above as well as by NB-IoT apparatus 1010 described below. Solely for illustrative purposes and without limiting the scope, description of process 700 is provided below in the context of NB-IoT apparatus and network apparatus. Process 700 may begin at 710.

At 710, the NB-IoT apparatus may configure the transmission power level $P_{TX}=P_{max}$ according to the network information received from the network apparatus. The transmission power level $P_{max}$ is configured by the network apparatus. Process 700 may proceed from 710 to 720.

At 720, the NB-IoT apparatus may perform uplink data transmission via an uplink channel with the transmission power level $P_{TX}=\min\{P_{TX},P_{max}\}$. Process 700 may proceed from 720 to 730.

At 730, the NB-IoT apparatus may determine whether the channel quality is greater than a predetermined condition. If yes, process 700 may proceed from 730 to 740. If no, process 700 may proceed from 730 to 750.

At 740, the NB-IoT apparatus may reduce the transmission power level by $P_{TX}=P_{TX}-\Delta P_{ACK}$. Process 700 may further proceed from 740 to 720.

At 750, the NB-IoT apparatus may increase the transmission power level by $P_{TX}=P_{TX}\Delta P_{NACK}$ or keep the transmission power level. Process 500 may further proceed from 750 to 720.

Figure 8:
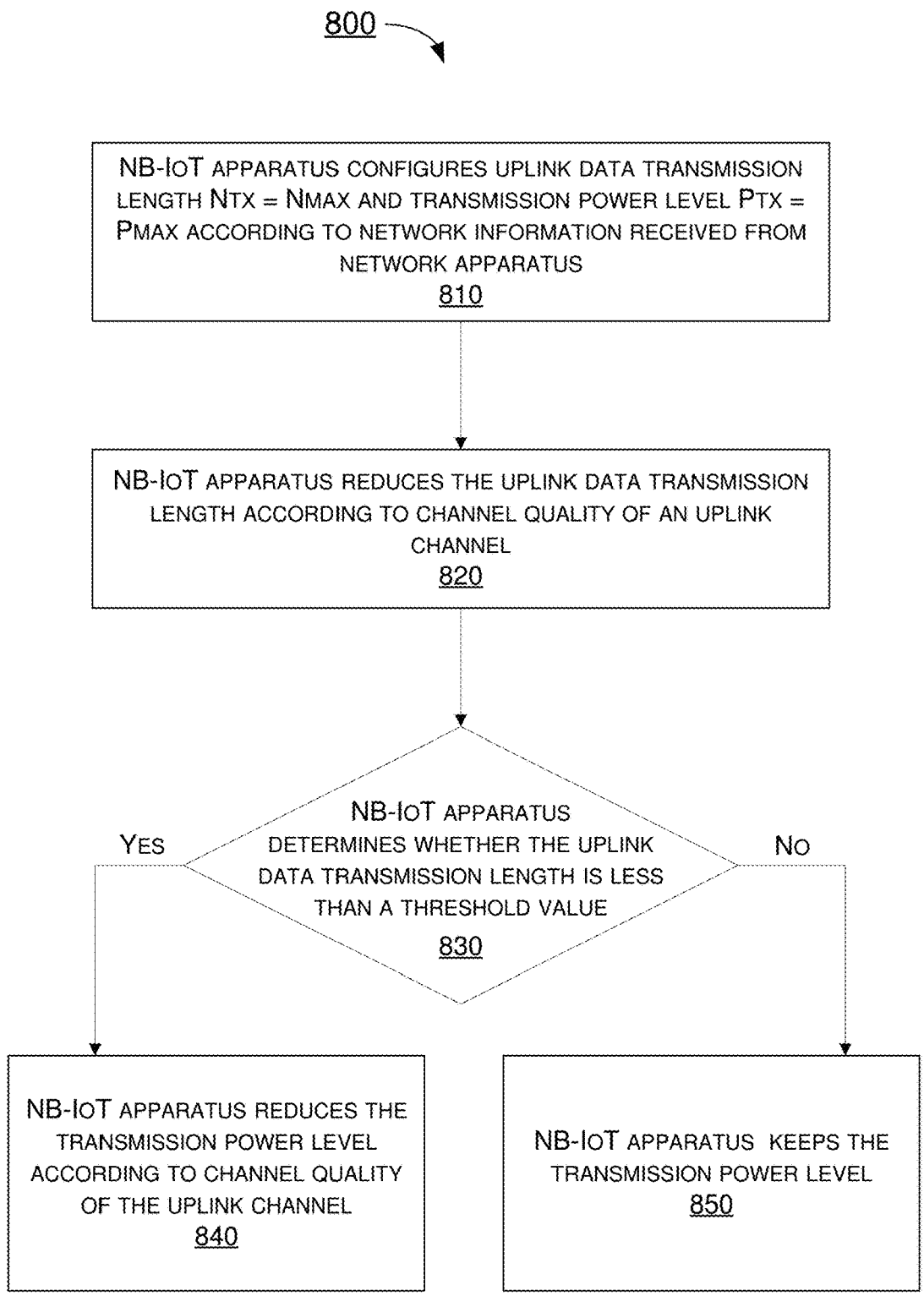
FIG. 8 is a diagram depicting an example process of reducing both uplink data transmission length and transmission power level in accordance with an implementation of the present disclosure.

FIG. 8 illustrates an example process 800 of reducing both uplink data transmission length and transmission power level in accordance with an implementation of the present disclosure. Process 800 may be implemented in any network involving a NB-IoT apparatus and a wireless network, to effect various features and/or aspects of the proposed concepts and schemes of the present disclosure. More specifically, process 800 may pertain to uplink power consumption reduction. Process 800 may include one or more operations, actions, or functions as represented by one or more of blocks 810, 820, 830, 840 and 850. Although illustrated as discrete blocks, various blocks of process 800 may be divided into additional blocks, combined into fewer blocks, or eliminated, depending on the desired implementation. Process 800 may be implemented, whether completely or partially, by the NB-IoT apparatus described above as well as by NB-IoT apparatus 1010 described below. Solely for illustrative purposes and without limiting the scope, description of process 800 is provided below in the context of NB-IoT apparatus and network apparatus. Process 800 may begin at 810.

At 810, the NB-IoT apparatus may configure the uplink data transmission length $N_{TX}=N_{max}$ and the transmission power level $P_{TX}=P_{max}$ according to the network information received from the network apparatus. The uplink data transmission length $N_{max}$ and the transmission power level $P_{max}$ are configured by the network apparatus. Process 800 may proceed from 810 to 820.

At 820, the NB-IoT apparatus may reduce the uplink data transmission length according to channel quality of an uplink channel. Process 800 may proceed from 820 to 830.

At 830, the NB-IoT apparatus may determine whether the uplink data transmission length is less than a threshold value. If yes, process 800 may proceed from 830 to 840. If no, process 800 may proceed from 830 to 850.

At 840, the NB-IoT apparatus may reduce the transmission power level according to channel quality of the uplink channel.

At 850, the NB-IoT apparatus may keep the transmission power level. In some implementations, process 800 may further proceed from 850 to 820.

Figure 9:
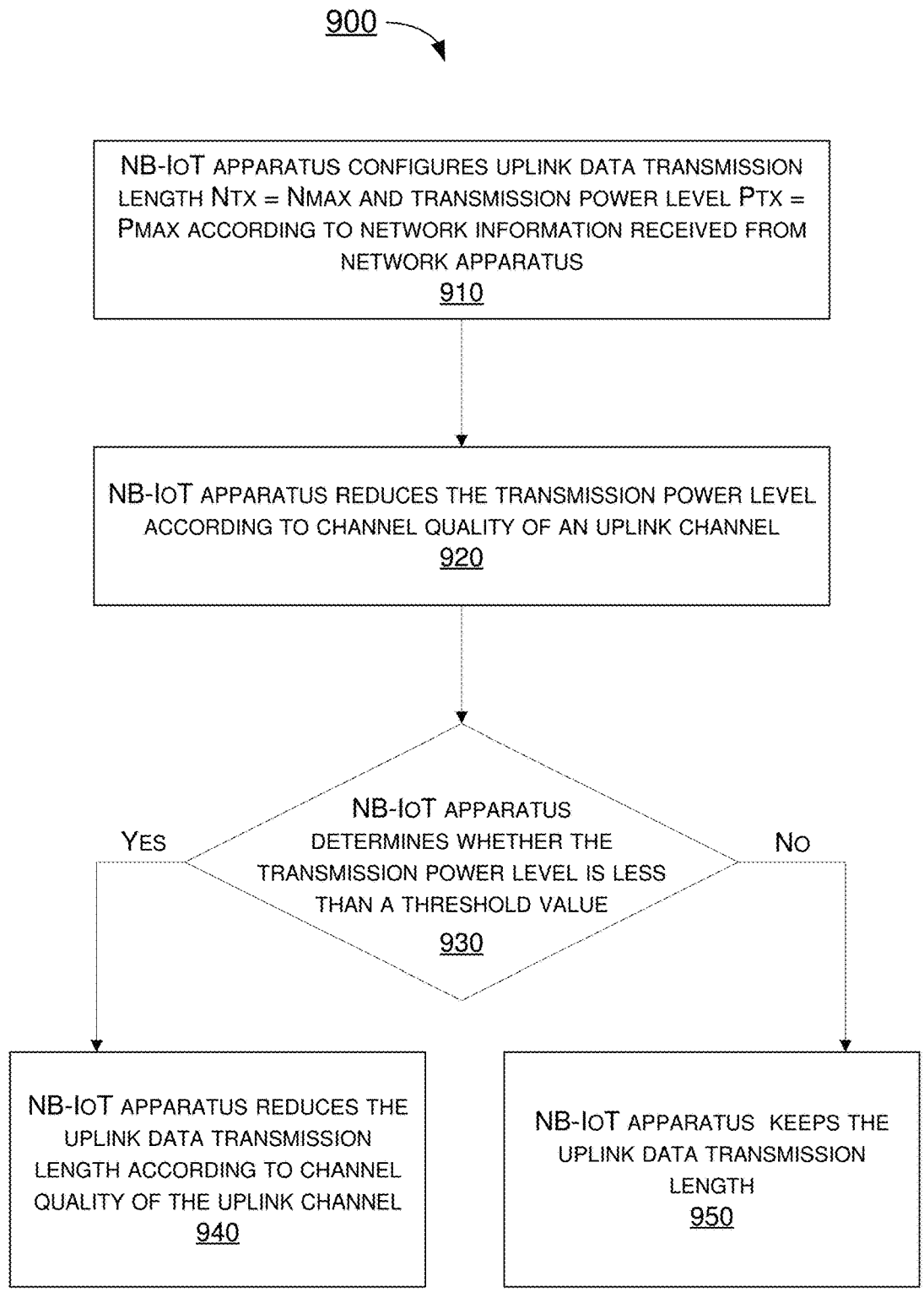
FIG. 9 is a diagram depicting an example process of reducing both uplink data transmission length and transmission power level in accordance with an implementation of the present disclosure.

FIG. 9 illustrates an example process 900 of reducing both uplink data transmission length and transmission power level in accordance with an implementation of the present disclosure. Process 900 may be implemented in any network involving a NB-IoT apparatus and a wireless network, to effect various features and/or aspects of the proposed concepts and schemes of the present disclosure. More specifically, process 900 may pertain to uplink power consumption reduction. Process 900 may include one or more operations, actions, or functions as represented by one or more of blocks 910, 920, 930, 940 and 950. Although illustrated as discrete blocks, various blocks of process 900 may be divided into additional blocks, combined into fewer blocks, or eliminated, depending on the desired implementation. Process 900 may be implemented, whether completely or partially, by the NB-IoT apparatus described above as well as by NB-IoT apparatus 1010 described below. Solely for illustrative purposes and without limiting the scope, description of process 900 is provided below in the context of NB-IoT apparatus and network apparatus. Process 900 may begin at 910.

At 910, the NB-IoT apparatus may configure the uplink data transmission length $N_{TX}=N_{max}$ and the transmission power level $P_{TX}=P_{max}$ according to the network information received from the network apparatus. The uplink data transmission length $N_{max}$ and the transmission power level $P_{max}$ are configured by the network apparatus. Process 900 may proceed from 910 to 920.

At 920, the NB-IoT apparatus may reduce the transmission power level according to channel quality of an uplink channel. Process 900 may proceed from 920 to 930.

At 930, the NB-IoT apparatus may determine whether the transmission power level is less than a threshold value. If yes, process 900 may proceed from 930 to 940. If no, process 900 may proceed from 930 to 950.

At 940, the NB-IoT apparatus may reduce the uplink data transmission length according to channel quality of the uplink channel.

At 950, the NB-IoT apparatus may keep the uplink data transmission length. In some implementations, process 900 may further proceed from 950 to 920.

Illustrative Implementations

Figure 10:
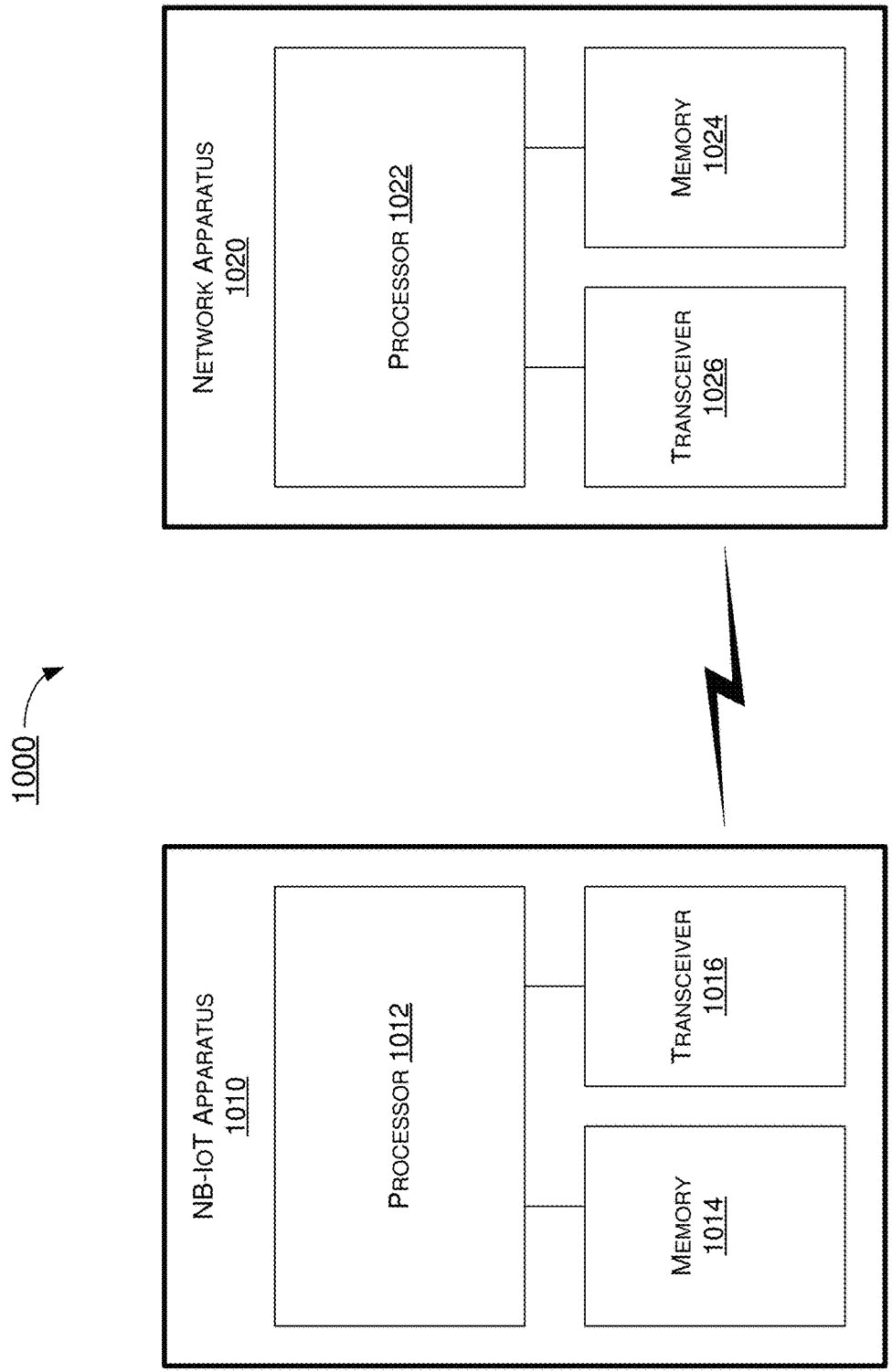
FIG. 10 is a block diagram of an example NB-IoT apparatus and an example network apparatus in accordance with an implementation of the present disclosure.

FIG. 10 illustrates an example NB-IoT apparatus 1010 and an example network apparatus 1020 in accordance with an implementation of the present disclosure. Each of NB-IoT apparatus 1010 and network apparatus 1020 may perform various functions to implement schemes, techniques, processes and methods described herein pertaining to uplink power consumption reduction with respect to user equipment in wireless communications, including scenarios 100, 300, 400 and 600 described above as well as processes 200, 500, 700, 800 and 900 described above and processes 1100-1300 described below.

NB-IoT apparatus 1010 may be a part of an electronic apparatus, which may be a user equipment (UE) such as a portable or mobile apparatus, a wearable apparatus, a wireless communication apparatus or a computing apparatus. For instance, NB-IoT apparatus 1010 may be implemented in a smartphone, a smartwatch, a personal digital assistant, a digital camera, or a computing equipment such as a tablet computer, a laptop computer or a notebook computer. NB-IoT apparatus 1010 may also be a part of a machine type apparatus, which may be an IoT apparatus such as an immobile or a stationary apparatus, a home apparatus, a wire communication apparatus or a computing apparatus. For instance, NB-IoT apparatus 1010 may be implemented in a smart thermostat, a smart fridge, a smart door lock, a wireless speaker or a home control center. Alternatively, NB-IoT apparatus 1010 may be implemented in the form of one or more integrated-circuit (IC) chips such as, for example and without limitation, one or more single-core processors, one or more multi-core processors, or one or more complex-instruction-set-computing (CISC) processors. NB-IoT apparatus 1010 may include at least some of those components shown in FIG. 10 such as a processor 1012, for example. NB-IoT apparatus 1010 may further include one or more other components not pertinent to the proposed scheme of the present disclosure (e.g., internal power supply, display device and/or user interface device), and, thus, such component(s) of NB-IoT apparatus 1010 are neither shown in FIG. 10 nor described below in the interest of simplicity and brevity.

Network apparatus 1020 may be a part of an electronic apparatus, which may be a network node such as a base station, a small cell, a router or a gateway. For instance, network apparatus 1020 may be implemented in an eNodeB in a LTE, LTE-Advanced or LTE-Advanced Pro network or in a gNB in a 5G, NR or IoT network. Alternatively, network apparatus 1020 may be implemented in the form of one or more IC chips such as, for example and without limitation, one or more single-core processors, one or more multi-core processors, or one or more CISC processors. Network apparatus 1020 may include at least some of those components shown in FIG. 10 such as a processor 1022, for example. Network apparatus 1020 may further include one or more other components not pertinent to the proposed scheme of the present disclosure (e.g., internal power supply, display device and/or user interface device), and, thus, such component(s) of network apparatus 1020 are neither shown in FIG. 10 nor described below in the interest of simplicity and brevity.

In one aspect, each of processor 1012 and processor 1022 may be implemented in the form of one or more single-core processors, one or more multi-core processors, or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including uplink power consumption reduction in a device (e.g., as represented by NB-IoT apparatus 1010) and a network (e.g., as represented by network apparatus 1020) in accordance with various implementations of the present disclosure.

In some implementations, NB-IoT apparatus 1010 may also include a transceiver 1016 coupled to processor 1012 and capable of wirelessly transmitting and receiving data. In some implementations, NB-IoT apparatus 1010 may further include a memory 1014 coupled to processor 1012 and capable of being accessed by processor 1012 and storing data therein. In some implementations, network apparatus 1020 may also include a transceiver 1026 coupled to processor 1022 and capable of wirelessly transmitting and receiving data. In some implementations, network apparatus 1020 may further include a memory 1024 coupled to processor 1022 and capable of being accessed by processor 1022 and storing data therein. Accordingly, NB-IoT apparatus 1010 and network apparatus 1020 may wirelessly communicate with each other via transceiver 1016 and transceiver 1026, respectively. To aid better understanding, the following description of the operations, functionalities and capabilities of each of NB-IoT apparatus 1010 and network apparatus 1020 is provided in the context of a NB-IoT environment in which NB-IoT apparatus 1010 is implemented in or as a NB-IoT apparatus or a UE and network apparatus 1020 is implemented in or as a network node of a NB-IoT network.

The following description pertains to the operations, functionalities and capabilities of NB-IoT apparatus 1010.

In some implementations, processor 1012 may be configured to transmit, via transceiver 1016, uplink data to the network apparatus via an uplink channel such as, for example and without limitation, a Narrowband Physical Random Access Channel (NPRACH) or a Narrowband Physical Uplink Shared Channel (NPUSCH). Processor 1012 may further be configured to receive, via transceiver 1016, an uplink data transmission length from the network apparatus. The uplink data transmission length is configured by the network apparatus for NB-IoT apparatus 1010 to perform uplink data transmission via the NPUSCH. The NB-IoT apparatus may be configured to perform uplink data transmission during the uplink data transmission length. The NB-IoT apparatus may be configured to transmit repetition data for increasing signal diversity and robustness. The NB-IoT apparatus may further be configured a plurality of uplink transmission gaps in the uplink data transmission length for the NB-IoT apparatus to perform timing or frequency reacquisition.

In some implementations, processor 1012 may be configured to monitor and determine whether an ACK indicator is received from the network apparatus during transmission gaps of an uplink channel (e.g., NPDCCH or PRACH). If the ACK indicator is received, it means that the network apparatus has received and decoded the uplink data successfully, processor 1012 is configured to terminate uplink data transmission after receiving the ACK indicator. Thus, the uplink data transmission can be early terminated and the uplink transmission power consumption can be reduced. If the ACK indicator is not received, processor 1012 is configured to continue the uplink data transmission.

In some implementations, processor 1012 may be configured to estimate channel quality of an uplink channel (e.g., NPDCCH or PRACH). Processor 1012 may further be configured to adjust uplink data transmission length according to the channel quality. More specifically, processor 1012 may be configured to determine whether the channel quality is greater than a predetermined condition. Processor 1012 may adjust the uplink data transmission length by a scaling factor $\alpha$ according to the channel quality. When the channel quality is greater than a predetermined condition, processor 1012 may adjust the scaling factor by $\alpha=\alpha-\Delta_{ACK}$. When the channel quality is less than a predetermined condition, processor 1012 may adjust the scaling factor by $\alpha=\alpha+\Delta_{NACK}$. Processor 1012 may also adjust the scaling factor by an ACK offset value $\Delta_{ACK}$ or a NACK offset value $\Delta_{NACK}$ according to the channel quality. For example, if the channel quality is good, processor 1012 may increase the ACK offset value $\Delta_{ACK}$ from 0.1 to 0.2. If the channel quality is bad, processor 1012 may increase the NACK offset value $\Delta_{NACK}$ from 0.1 to 0.2. Accordingly, if the channel quality is greater than a predetermined condition, processor 1012 may be configured to reduce the uplink data transmission length to reduce uplink power consumption.

In some implementations, processor 1012 may be configured to directly terminate uplink data transmission after a predetermined part of the uplink data has been transmitted. Processor 1012 may be configured to only turn on transmission (TX) and transmit the uplink data in an on duration and turn off transmission in an off duration. In some implementations, processor 1012 may be configured to turn off transceiver 1016 or part of front end circuits during the off duration to reduce power consumption.

In some implementations, processor 1012 may be configured to adjust the uplink data transmission length by a predetermined on/off pattern. Specifically, processor 1012 may be configured to determine a ratio of on/off duration $\beta$ for a short period and repeatedly apply the ratio of on/off duration $\beta$ to the whole uplink data transmission length. When the channel quality is greater than a predetermined condition, processor 1012 may adjust the ratio of on/off duration by $\beta=\beta-\Delta_{ACK}$. When the channel quality is less than a predetermined condition, processor 1012 may adjust the ratio of on/off duration by $\beta=\beta+\Delta_{NACK}$. Processor 1012 may also adjust the ACK offset value $\Delta_{ACK}$ and the NACK offset value $\Delta_{NACK}$ according to the channel quality. For example, if the channel quality is good, processor 1012 may adjust the ACK offset value $\Delta_{ACK}$ from 0.1 to 0.2. If the channel quality is bad, processor 1012 may adjust the NACK offset value $\Delta_{NACK}$ from 0.1 to 0.2.

In some implementations, the network apparatus may schedule reference signals such as Demodulation Reference Signal (DMRS) in a downlink channel. The NB-IoT apparatus may need to receive the reference signals for channel estimation. Accordingly, if reference signals are scheduled in the off durations, processor 1012 may be configured to turn on transceiver 1016 to receive the reference signals in the downlink channel.

In some implementations, processor 1012 may be configured to determine whether the channel quality is greater than a predetermined condition in different ways. For example, processor 1012 may be configured to estimate the channel quality by determining whether a plurality of consecutive ACK indicators are received. If processor 1012 receives N consecutive ACK indicators, it means that the uplink data are all transmitted successfully and the channel quality is good. The value of N may be adjusted according to practical applications. Alternatively, processor 1012 may be configured to estimate the channel quality by determining whether path loss or block error rate (BLER) of the uplink channel is less than a threshold. If path loss or BLER of the uplink channel is low, it means that the channel quality is good. Alternatively, processor 1012 may be configured to estimate the channel quality by determining whether a predetermined percentage of ACK indicators are received within a predetermined period T. If processor 1012 receives a predetermined percentage (e.g., 90%) of ACK indicators within the predetermined period T, it means that most uplink data are transmitted successfully and the channel quality is good. The predetermined percentage may be adjusted according to practical applications. Processor 1012 may also adjust the predetermined period T according to channel quality of the uplink channel. If the channel quality is good, processor 1012 may reduce the predetermined period T. If the channel quality is bad, processor 1012 may increase the predetermined period T. If the NB-IoT apparatus reselects to a new network apparatus, processor 1012 may reset the predetermined period T to an initial value.

In some implementations, processor 1012 may be configured to receive, via transceiver 1016, a transmission power level $P_{max}$ from the network apparatus. The transmission power level $P_{max}$ is configured by the network apparatus for NB-IoT apparatus 1010 to perform uplink data transmission via the NPUSCH. Processor 1012 may further be configured to estimate channel quality of the NPUSCH and adjust the transmission power level according to the channel quality. More specifically, processor 1012 may be configured to determine whether the channel quality is greater than a predetermined condition and adjust the transmission power level by an ACK power offset value $\Delta P_{ACK}$ or a NACK power offset value $\Delta P_{NACK}$ according to the channel quality. When the channel quality is greater than a predetermined condition, processor 1012 may adjust the transmission power level by $P_{TX}=P_{TX}-\Delta P_{ACK}$. When the channel quality is less than a predetermined condition, processor 1012 may adjust the transmission power level by $P_{TX}=P_{TX}+\Delta P_{NACK}$. Processor 1012 may also adjust the ACK power offset value $\Delta P_{ACK}$ and the NACK power offset value $\Delta P_{NACK}$ according to the channel quality. For example, if the channel quality is good, processor 1012 may adjust the ACK power offset value $\Delta P_{ACK}$ from 3 dB to 6 dB. If the channel quality is bad, processor 1012 may adjust the NACK power offset value $\Delta P_{NACK}$ from 3 dB to 6 dB. Accordingly, if the channel quality is greater than a predetermined condition, processor 1012 may be configured to reduce the transmission power level to reduce uplink power consumption.

In some implementations, if the channel quality is greater than a predetermined condition, processor 1012 may be configured to directly reduce the transmission power level by 3 dB during the whole uplink data transmission length. If the channel quality is good enough, the NB-IoT apparatus may directly reduce the transmission power level by 6 dB or 9 dB during the whole uplink data transmission length.

In some implementations, if the channel quality is greater than a predetermined condition, processor 1012 may be configured to gradually reduce the transmission power level to reduce uplink power consumption. For example, processor 1012 may be configured to reduce the transmission power level by 3 dB in a first period, reduce the transmission power level by 6 dB in a second period and reduce the transmission power level by 9 dB in a third period.

In some implementations, processor 1012 may be configured to reduce both uplink data transmission length and transmission power level to reduce uplink power consumption. Specifically, processor 1012 may be configured to reduce the uplink data transmission length according to channel quality of an uplink channel first. Processor 1012 may be further configured to determine whether the uplink data transmission length is less than a threshold value. If yes, processor 1012 may be configured to further reduce the transmission power level according to channel quality of the uplink channel. If no, processor 1012 may be configured to keep the transmission power level.

In some implementations, processor 1012 may be configured to reduce both uplink data transmission length and transmission power level to reduce uplink power consumption. Specifically, processor 1012 may be configured to reduce the transmission power level according to channel quality of an uplink channel. Processor 1012 may be further configured to determine whether the transmission power level is less than a threshold value. If yes, processor 1012 may be configured to further reduce the uplink data transmission length according to channel quality of the uplink channel. If no, processor 1012 may be configured to keep the uplink data transmission length.

The following description pertains to the operations, functionalities and capabilities of network apparatus 1020.

In some implementations, processor 1022 may be configured to transmit downlink data to NB-IoT apparatus 1010 via a downlink channel such as, for example and without limitation, a Narrowband Physical Downlink Control Channel (NPDCCH). Processor 1022 may be configured to transmit, via transceiver 1026, an uplink data transmission length or a transmission power level for the NB-IoT apparatus 1010 to perform uplink data transmission via an uplink channel. Processor 1022 may be further configured to configure a plurality of uplink transmission gaps in the uplink data transmission length for the NB-IoT apparatus to perform timing or frequency reacquisition.

In some implementations, when processor 1022 receives, via transceiver 1026, parts of uplink data, processor 1022 may be configured to decode the uplink data before receiving all the uplink data. Processor 1022 may be further configured to determine whether the received uplink data can be decoded successfully. If yes, processor 1022 may be configured to transmit an ACK indicator to the NB-IoT apparatus 1010 in the uplink transmission gaps. If no, processor 1022 may be configured not to transmit an ACK indicator to the NB-IoT apparatus 1010 or transmit a NACK indicator to the NB-IoT apparatus 1010.

Illustrative Processes

Figure 11:
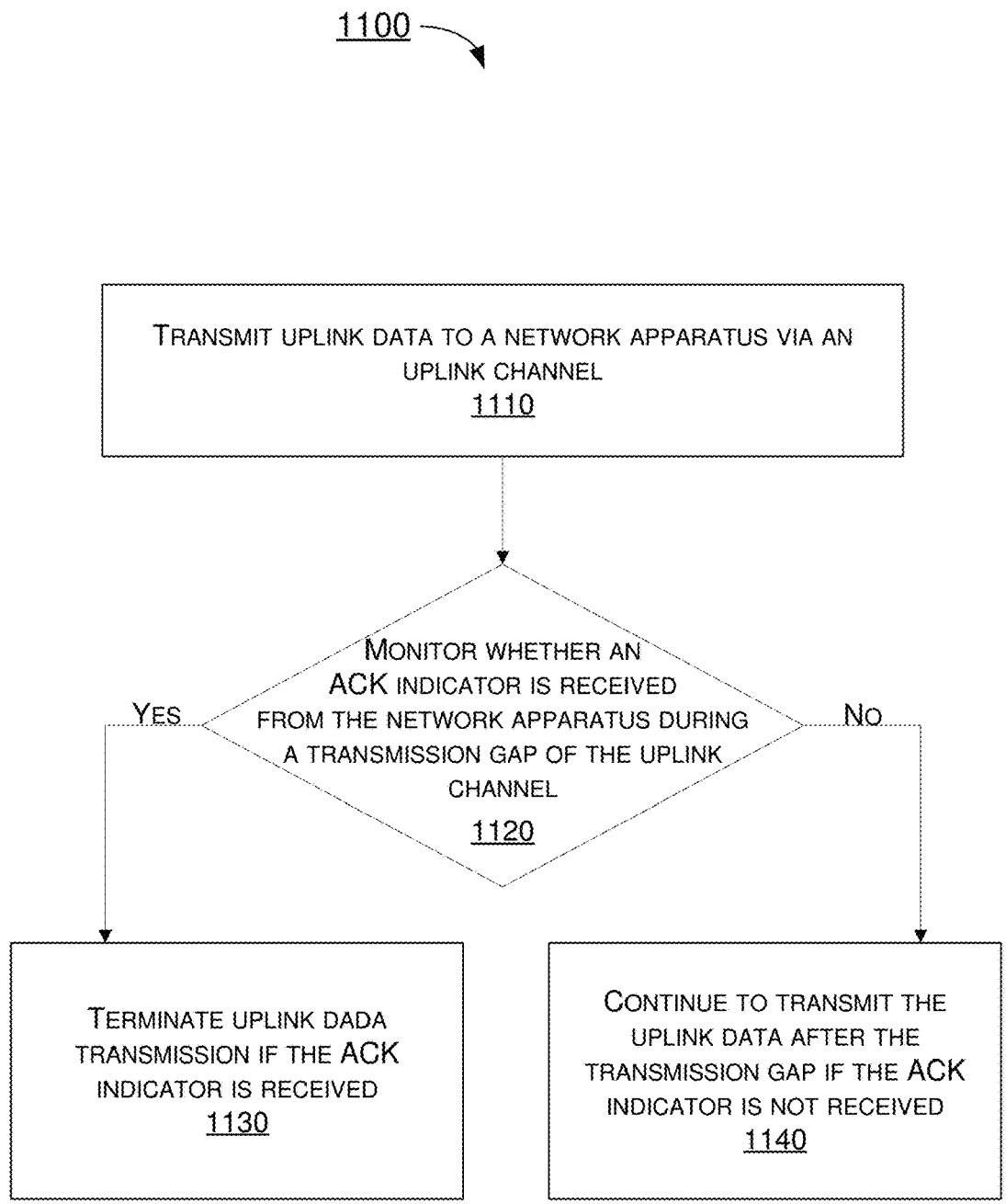
FIG. 11 is a flowchart of an example process in accordance with an implementation of the present disclosure.

FIG. 11 illustrates an example process 1100 in accordance with an implementation of the present disclosure. Process 1100 may be an example implementation of scenarios 100, whether partially or completely, with respect to uplink power consumption reduction in accordance with the present disclosure. Process 1100 may represent an aspect of implementation of features of NB-IoT apparatus 1010. Process 1100 may include one or more operations, actions, or functions as illustrated by one or more of blocks 1110, 1120, 1130 and 1140. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by NB-IoT apparatus 1010 or any suitable UE or machine type devices. Solely for illustrative purposes and without limitation, process 1100 is described below in the context of NB-IoT apparatus 1010. Process 1100 may begin at block 1110.

At 1110, process 1100 may involve NB-IoT apparatus 1010 transmitting uplink data to a network apparatus via an uplink channel. The uplink channel may be, for example and without limitation, a NPRACH or a NPUSCH. Process 1100 may proceed from 1110 to 1120.

At 1120, process 1100 may involve NB-IoT apparatus 1010 monitoring whether an ACK indicator is received from the network apparatus during a transmission gap of the uplink channel. If yes, process 1100 may proceed from 1120 to 1130. If no, process 1100 may proceed from 1120 to 1140.

At 1130, process 1100 may involve NB-IoT apparatus 1010 terminating uplink data transmission if the ACK indicator is received.

At 1140, process 1100 may involve NB-IoT apparatus 1010 continuing to transmit the uplink data after the transmission gap if the ACK indicator is not received.

Figure 12:
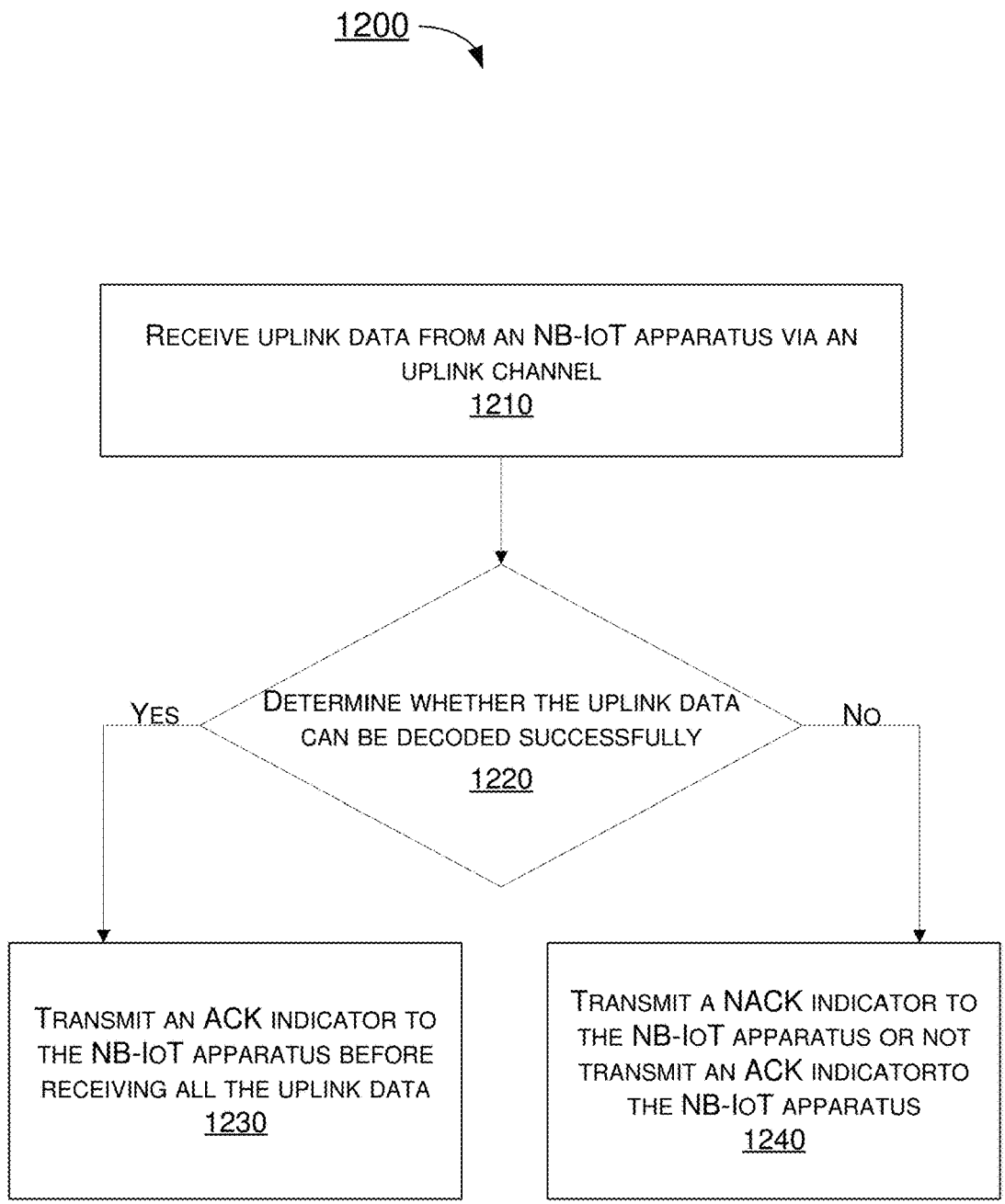
FIG. 12 is a flowchart of an example process in accordance with an implementation of the present disclosure.

FIG. 12 illustrates an example process 1200 in accordance with an implementation of the present disclosure. Process 1200 may be an example implementation of scenario 100, whether partially or completely, with respect to uplink power consumption reduction in accordance with the present disclosure. Process 1200 may represent an aspect of implementation of features of network apparatus 1020. Process 1200 may include one or more operations, actions, or functions as illustrated by one or more of blocks 1210, 1220, 1230 and 1240. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Process 1200 may be implemented by network apparatus 1020 or any suitable network node. Solely for illustrative purposes and without limitation, process 1200 is described below in the context of network apparatus 1020. Process 1200 may begin at block 1210.

At 1210, process 1200 may involve network apparatus 1020 receiving uplink data from a NB-IoT apparatus via an uplink channel. Process 1200 may proceed from 1210 to 1220.

At 1220, process 1200 may involve network apparatus 1020 determining whether the uplink data can be decoded successfully. If yes, process 1200 may proceed from 1220 to 1230. If no, process 1200 may proceed from 1220 to 1240.

At 1230, process 1200 may involve network apparatus 1020 transmitting an ACK indicator to the NB-IoT apparatus before receiving all the uplink data.

At 1240, process 1200 may involve network apparatus 1020 transmitting a NACK indicator to the NB-IoT apparatus or not transmitting an ACK indicator to the NB-IoT apparatus.

Figure 13:
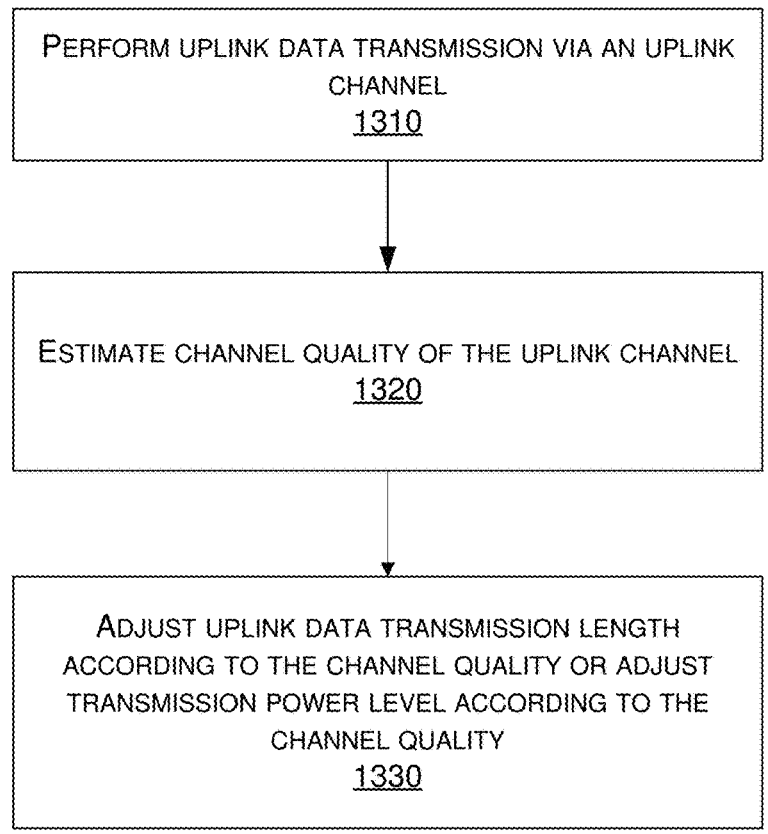
FIG. 13 is a flowchart of an example process in accordance with an implementation of the present disclosure.

FIG. 13 illustrates an example process 1300 in accordance with an implementation of the present disclosure. Process 1300 may be an example implementation of one, some or all of scenarios 300, 400 and 600, whether partially or completely, with respect to uplink power consumption reduction in accordance with the present disclosure. Process 1300 may represent an aspect of implementation of features of NB-IoT apparatus 1010. Process 1300 may include one or more operations, actions, or functions as illustrated by one or more of blocks 1310, 1320 and 1330. Although illustrated as discrete blocks, various blocks of process 1300 may be divided into additional blocks, combined into fewer blocks, or eliminated, depending on the desired implementation. Moreover, the blocks of process 1100 may executed in the order shown in FIG. 13 or, alternatively, in a different order. Process 1300 may be implemented by NB-IoT apparatus 1010 or any suitable UE or machine type devices. Solely for illustrative purposes and without limitation, process 1300 is described below in the context of NB-IoT apparatus 1010. Process 1300 may begin at block 1310.

At 1310, process 1300 may involve NB-IoT apparatus 1010 performing uplink data transmission via an uplink channel. Process 1300 may proceed from 1310 to 1320.

At 1320, process 1300 may involve NB-IoT apparatus 1010 estimating channel quality of the uplink channel. Process 1300 may proceed from 1320 to 1330.

At 1330, process 1300 may involve NB-IoT apparatus 1010 adjusting uplink data transmission length according to the channel quality or adjusting transmission power level according to the channel quality.

In some implementations, in adjusting uplink data transmission length according to the channel quality, process 1300 may involve NB-IoT apparatus 1010 reducing the uplink data transmission length if the channel quality is greater than a predetermined condition.

In some implementations, in reducing the uplink data transmission length, process 1300 may involve NB-IoT apparatus 1010 turning off a radio frequency circuit of the NB-IoT apparatus after a predetermined part of the uplink data is transmitted or turning off a radio frequency circuit of the NB-IoT apparatus for parts of the uplink data transmission length.

In some implementations, in reducing the uplink data transmission length, process 1300 may involve NB-IoT apparatus 1010 turning on a radio frequency circuit of the NB-IoT apparatus for reference signals in a downlink channel.

In some implementations, process 1300 may further involve NB-IoT apparatus 1010 determining whether the uplink data transmission length is less than a threshold value and adjusting transmission power level according to the channel quality if the uplink data transmission length is less than the threshold value.

In some implementations, in adjusting transmission power level according to the channel quality, process 1300 may involve NB-IoT apparatus 1010 reducing the transmission power level if the channel quality is greater than a predetermined condition.

In some implementations, in reducing the transmission power level, process 1300 may involve NB-IoT apparatus 1010 reducing to a predetermined transmission power level for whole uplink data transmission length or gradually reducing the transmission power level during uplink data transmission length.

In some implementations, process 1300 may further involve NB-IoT apparatus 1010 determining whether the transmission power level is less than a threshold value and adjusting uplink data transmission length according to the channel quality if the transmission power level is less than the threshold value.

In some implementations, in estimating channel quality of the uplink channel, process 1300 may involve NB-IoT apparatus 1010 determining whether a plurality of consecutive ACK indicators are received, determining whether path loss of the uplink channel is less than a threshold or determining whether a predetermined percentage of ACK indicators are received within a predetermined period.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for use in a Narrow Band-Internet of Things (NB-IoT) apparatus, comprising:

transmitting, by a processor of the NB-IoT apparatus, uplink data to a network apparatus via an uplink channel;

monitoring, by the processor of the NB-IoT apparatus, whether an acknowledgement (ACK) indicator is received from the network apparatus during a transmission gap of the uplink channel;

terminating, by the processor of the NB-IoT apparatus, uplink data transmission if the ACK indicator is received;

estimating, by the processor of the NB-IoT apparatus, channel quality of the uplink channel by determining whether a predetermined number N of consecutive ACK indicators are received, with N being a positive integer, and adjusting, by the processor of the NB-IoT apparatus, a length of time scheduled for the uplink data transmission by a scaling factor or a ratio of on/off duration using an ACK offset value and a negative acknowledgement (NACK) offset value that are adjusted according to the channel quality.

2. The method of claim 1, further comprising:
   continuing to transmit, by the processor of the NB-IoT apparatus, the uplink data after the transmission gap if the ACK indicator is not received.

3. The method of claim 1, wherein the uplink channel is a Narrowband Physical Random Access Channel (NPRACH) or a Narrowband Physical Uplink Shared Channel (NPUSCH).

4. The method of claim 1, wherein the ACK indicator is received via a Narrowband Physical Downlink Control Channel (NPDCCH).

5. A method for use in a network apparatus, comprising:
   receiving, by a processor of the network apparatus, uplink data from a NB-IoT apparatus via an uplink channel;

decoding, by the processor of the network apparatus, the uplink data; and transmitting, by the processor of the network apparatus, an ACK indicator to the NB-IoT apparatus if the uplink data is decoded successfully, wherein the uplink data is received during one or more of plurality of non-consecutive time slots within a length of time scheduled for uplink data transmission from the NB-IoT apparatus to the network apparatus, wherein the ACK indicator is transmitted before receiving all the uplink data before end of the time scheduled for uplink data transmission from the NB-IoT apparatus to the network apparatus, wherein the ACK indicator is transmitted during a gap between two of the non-consecutive time slots, and wherein the length of time scheduled for uplink data transmission from the NB-IoT apparatus to the network apparatus is adjusted by a scaling factor or a ratio of on/off duration using an ACK offset value and a negative acknowledgement (NACK) offset value that are adjusted according to a channel quality.

6. The method of claim 5, wherein the uplink channel is a Narrowband Physical Random Access Channel (NPRACH) or a Narrowband Physical Uplink Shared Channel (NPUSCH).

7. The method of claim 5, wherein the ACK indicator is transmitted in a transmission gap of the uplink channel via a Narrowband Physical Downlink Control Channel (NPDCCH).

8. A method for use in a Narrow Band-Internet of Things (NB-IoT) apparatus, comprising:

performing, by a processor of the NB-IoT apparatus, uplink data transmission via an uplink channel;

estimating, by the processor of the NB-IoT apparatus, channel quality of the uplink channel; and adjusting, by the processor of the NB-IoT apparatus, an uplink data transmission length according to the channel quality;

wherein estimating channel quality of the uplink channel comprises determining whether a predetermined consecutive number of ACK indicators are received, wherein adjusting the uplink data transmission length comprises adjusting the uplink data transmission length by a scaling factor or a ratio of on/off duration by:

decreasing the scaling factor or the ratio of on/off duration by an acknowledgement (ACK) offset value in an event that the channel quality is greater than a predetermined condition;

increasing the scaling factor or the ratio of on/off duration by a negative acknowledgement (NACK) offset value in an event that the channel quality is less than the predetermined condition; and adjusting the ACK offset value and the NACK offset value according to the channel quality.

9. The method of claim 8, wherein adjusting uplink data transmission length according to the channel quality further comprises:

reducing, by the processor of the NB-IoT apparatus, the uplink data transmission length if the channel quality is greater than a predetermined condition.

10. The method of claim 9, wherein reducing the uplink data transmission length further comprises:

turning off, by the processor of the NB-IoT apparatus, a radio frequency circuit of the NB-IoT apparatus after a predetermined part of the uplink data is transmitted.

11. The method of claim 9, wherein reducing the uplink data transmission length further comprises:

turning off, by the processor of the NB-IoT apparatus, a radio frequency circuit of the NB-IoT apparatus for parts of the uplink data transmission length.

12. The method of claim 9, wherein reducing the uplink data transmission length further comprises:

turning on, by the processor of the NB-IoT apparatus, a radio frequency circuit of the NB-IoT apparatus for reference signals in a downlink channel.

13. The method of claim 8, wherein estimating channel quality of the uplink channel further comprises:

determining, by the processor of the NB-IoT apparatus, whether a plurality of consecutive ACK indicators are received; or determining, by the processor of the NB-IoT apparatus, whether path loss of the uplink channel is less than a threshold.

14. A method for use in a Narrow Band-Internet of Things (NB-IoT) apparatus, comprising:

performing, by a processor of the NB-IoT apparatus, uplink data transmission via an uplink channel;

estimating, by the processor of the NB-IoT apparatus, channel quality of the uplink channel; and adjusting, by the processor of the NB-IoT apparatus, a transmission power level according to the channel quality, wherein estimating channel quality of the uplink channel comprises determining whether a predetermined consecutive number of ACK indicators are received, wherein adjusting the transmission power level comprises adjusting the transmission power level by an acknowledgement (ACK) power offset value or a negative acknowledgement (NACK) power offset value by:

decreasing the transmission power level by the ACK power offset value in an event that the channel quality is greater than a predetermined condition;

increasing the transmission power level by the NACK power offset value in an event that the channel quality is less than the predetermined condition; and adjusting the ACK power offset value and the NACK power offset value according to the channel quality.

15. The method of claim 14, wherein adjusting transmission power level according to the channel quality further comprises:

reducing, by the processor of the NB-IoT apparatus, the transmission power level if the channel quality is greater than a predetermined condition.

16. The method of claim 15, wherein reducing the transmission power level further comprises:

reducing, by the processor of the NB-IoT apparatus, to a predetermined transmission power level for whole uplink data transmission length.

17. The method of claim 15, wherein reducing the transmission power level further comprises:

gradually reducing, by the processor of the NB-IoT apparatus, the transmission power level during uplink data transmission length.

18. The method of claim 14, wherein estimating channel quality of the uplink channel further comprises:

determining, by the processor of the NB-IoT apparatus, whether a plurality of consecutive ACK indicators are received; or determining, by the processor of the NB-IoT apparatus, whether path loss of the uplink channel is less than a threshold.

* * * * *